United States Patent
Clarin

(10) Patent No.: US 9,834,296 B1
(45) Date of Patent: Dec. 5, 2017

(54) BALLONET DEPLOYMENT CONTROL PANELING SYSTEM

(71) Applicant: X Development LLC, Mountain View, CA (US)

(72) Inventor: Phillip John Clarin, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 45 days.

(21) Appl. No.: 14/704,625

(22) Filed: May 5, 2015

(51) Int. Cl.
*B64B 1/62* (2006.01)
*B64B 1/42* (2006.01)
*B64F 5/00* (2017.01)

(52) U.S. Cl.
CPC .............. *B64B 1/62* (2013.01); *B64B 1/42* (2013.01); *B64F 5/00* (2013.01)

(58) Field of Classification Search
CPC .... B64B 1/62; B64B 1/08; B64B 1/04; B64B 1/60; B64B 1/42; B64B 1/18; B64F 5/00
See application file for complete search history.

(56) References Cited

U.S. PATENT DOCUMENTS

| | | | |
|---|---|---|---|
| 2,492,800 A * | 12/1949 | Isom | B64B 1/40 244/31 |
| 3,432,122 A | 3/1969 | Flickinger et al. | |
| 4,773,617 A * | 9/1988 | McCampbell | B64B 1/60 244/128 |
| 6,116,538 A | 9/2000 | Hafelfinger | |
| 6,325,329 B1 * | 12/2001 | Meadows | B64B 1/40 244/31 |
| 2006/0157617 A1 * | 7/2006 | Perry | B64B 1/02 244/97 |
| 2014/0158823 A1 | 6/2014 | Smith et al. | |
| 2015/0298786 A1 * | 10/2015 | Stigler | B64B 1/10 244/30 |

OTHER PUBLICATIONS

Roach et al., U.S. Appl. No. 14/041,637, filed Sep. 30, 2013.
Roach et al., U.S. Appl. No. 14/144,493, filed Dec. 30, 2013.

* cited by examiner

*Primary Examiner* — Medhat Badawi
*Assistant Examiner* — Vicente Rodriguez
(74) *Attorney, Agent, or Firm* — McDonnell Boehnen Hulbert & Berghoff LLP

(57) ABSTRACT

A balloon system including a balloon envelope and a ballonet positioned within the balloon envelope, and a plurality of internal panels extending within the balloon envelope between the ballonet and the balloon envelope, wherein the plurality of internal panels are attached to an outside of the ballonet and attached to an inside of the balloon envelope to support the ballonet within the balloon envelope during inflation of the ballonet.

22 Claims, 8 Drawing Sheets

BALLONET DEPLOYMENT CONTROL PANELING SYSTEM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

The present embodiments are directed to a balloon system having an outer balloon envelope filled with a lifting gas such as helium, and a variable buoyancy system in the form of a ballonet that is located inside of the balloon envelope. The ballonet may be an elastic chamber configured to hold air and act as a ballast. The buoyancy of the balloon system may be adjusted by adding or removing air from the ballonet, and the ballonet may go from a completely un-inflated state to a completely inflated state many times during the life of the balloon where the ballonet may undergo undesirable twisting, bunching, stress, and/or strain during inflation.

The present embodiments include an internal paneling system that includes a plurality of internal panels that are attached to an inner surface of the balloon envelope and an outer surface of the ballonet. The panels serve to support the ballonet in a vertical position in the center portion of the balloon envelope. During deployment of the balloon, the ballonet is held in place vertically and the panels prevent the ballonet from moving to one side, and also prevent the ballonet from twisting or bunching, and lessen the effect of stress and strain on the ballonet during inflation of the ballonet. Upon inflation, the panels hold the ballonet in its proper vertical position in the center portion of the balloon envelope, and also prevent the ballonet from tilting to one side within the balloon envelope.

In one aspect, a balloon system is provided including a balloon envelope, a ballonet positioned within the balloon envelope, and a plurality of internal panels extending within the balloon envelope between the ballonet and the balloon envelope, wherein the plurality of internal panels are attached to an outside of the ballonet and attached to an inside of the balloon envelope to support the ballonet within the balloon envelope during inflation.

In another aspect, a balloon system is provided including a balloon envelope, a ballonet positioned within the balloon envelope, means for helping to prevent twisting and bunching of the ballonet during inflation of the ballonet, and means for centering the ballonet within the balloon envelope to prevent the ballonet from tilting to one side of the balloon envelope during inflation of the ballonet.

In a further aspect, a method of constructing a balloon system is provided including the steps of heat sealing adjacent gores of a ballonet together, heat sealing inner edges of a plurality of internal panels to the ballonet, heat sealing adjacent gores of a balloon envelope together, and heat sealing outer edges of the plurality of internal panels to the balloon envelope.

The present embodiments provide means for helping to prevent twisting or bunching of the ballonet during inflation of the ballonet, as well as means for holding the ballonet centered within the balloon envelope to prevent the ballonet from tilting to one side of the balloon envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
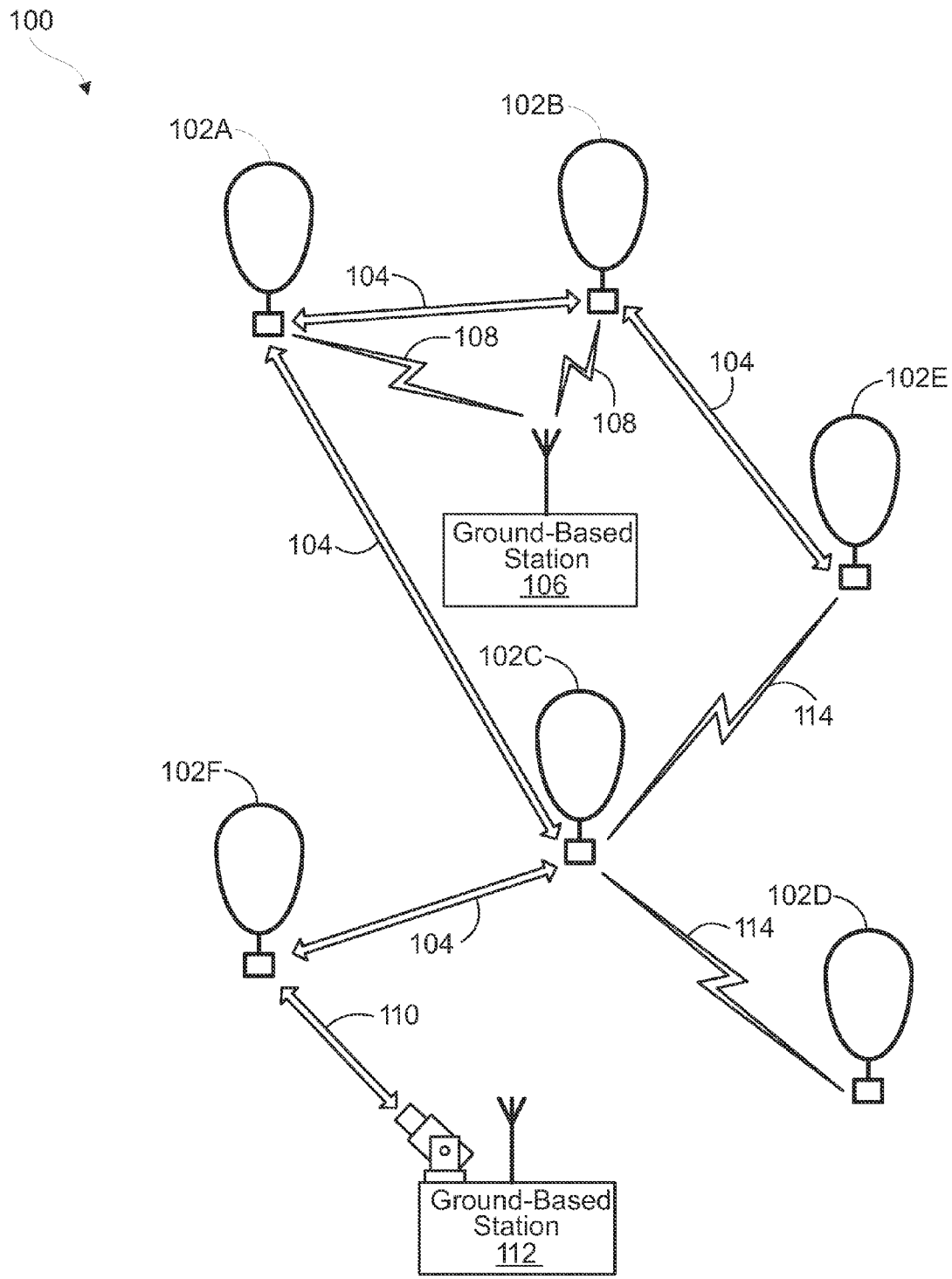
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. OVERVIEW

Example embodiments may generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations. Note, however, that example embodiments may also relate to a balloon generally, such as to a high-altitude balloon.

Various types of balloon systems may be incorporated in an exemplary balloon network. An exemplary embodiment may utilize high-altitude balloons, which typically operate in an altitude range between 18 km and 25 kilometers. In an exemplary embodiment, such high-altitude balloons may include an envelope, and a payload, along with various other components. Of course, embodiments described herein may also relate to or be implemented in conjunction with other types of balloons as well In an example embodiment, the balloon includes an outer balloon envelope filled with a lifting gas such as helium, and a variable buoyancy system in the form of a ballonet that is located inside of balloon envelope. The ballonet may be an elastic chamber configured to hold air and act as a ballast. The buoyancy of the balloon may be adjusted by changing the density and/or volume of the air in the ballonet. To change the density of the air in the ballonet, the balloon may be configured with systems and/or mechanisms for heating and/or cooling the air in the ballonet. Further, to change the volume of the air in the ballonet, the balloon may include pumps or other features for adding air to and/or removing air from the ballonet. Additionally or alternatively, to change the volume of air in the ballonet, the balloon may include release valves or other features that are controllable to allow air to escape from ballonet.

During altitude control descent maneuvering of the balloon, an internal ballonet is required to fill with air to add mass acting as an air ballast, thus causing the balloon to descend in altitude and influencing the direction of travel However, the ballonet (air ballast chamber) must be able to reliably go from a completely un-inflated state to a completely inflated state many times (cycles) during airborne flight during the balloon's total life. To this date there has not been a reliable balloon/ballonet design for altitude control that achieves this with a desired degree of reliability. Furthermore, a reliable ballonet deployment concept has not been achieved for practical manufacturing. Existing designs are prone to failures in flight due to twisting, bunching, and/or over stressing of the ballonet material during the air filing process of which the deployment of the ballonet is not controlled.

An existing balloon design called "Ibis" addresses the same altitude control challenge; however, Ibis is completely different in design and manufacturing. The Ibis balloon does not use a ballonet but a single wall to divide the balloon into chambers. The design has not proven to be reliable and has been determined not to be manufacturable at large scales, but most of all the design induces an extreme tilting of the overall system when inflating the air chamber which causes issues for any payloads under the system.

Therefore, it would be desirable to provide a balloon/ballonet system that provides for reliable, controlled deployment and inflation of the ballonet with air when it is desired to add ballast to the balloon, and that does not induce tilting of the balloon as the ballonet is filled with air. It would also be desirable to provide a balloon/ballonet system that may be more easily manufactured.

The present embodiments include an internal paneling system that includes a plurality of internal panels that are attached to an inner surface of the balloon envelope and an outer surface of the ballonet. The panels serve to support the ballonet in a vertical position in the center portion of the balloon envelope. During deployment of the balloon, the ballonet is held in place vertically and the panels prevent the ballonet from moving to one side. The internal panels also help to prevent the ballonet from twisting or bunching, thereby reducing the stress and strain on the ballonet during inflation of the ballonet. Upon inflation, the panels hold the ballonet in its proper vertical position in the center portion of the balloon envelope, and prevent the ballonet from tilting to one side.

The panels may extend vertically and may be equidistant from one other. In one embodiment, three panels may be spaced 120 degrees from each other, and in another embodiment, four panels may be spaced 90 degrees from one another. Additional panels could also be used, although additional panels add to the weight of the balloon, and require additional manufacturing steps. In some embodiments, the internal panels may extend for a portion of the balloon envelope and ballonet. For example, the internal panels may extend from the bottom of the ballonet to a mid-point of the envelope (as shown in the example below), or from the top of the balloon envelope to a mid-point of the ballonet. In this manner, the internal panels support the ballonet centered within the balloon envelope. The internal panels support the ballonet in an upright position within the balloon envelope, and serve to help prevent twisting, tangling, and/or buckling of the ballonet during inflation, thus reducing stress and strain on the ballonet during inflation. The internal panels support the ballonet weight and hold the ballonet in position in both the inflated and un-inflated state.

In other embodiments, the internal panels may extend completely from the top of the balloon envelope to the bottom of the balloon envelope. For example, four internal panels may be spaced apart 90 degrees from each other, and may be attached to the outside of the ballonet and extend completely between the ballonet and the balloon envelope from the top to the bottom of the balloon envelope. The internal panels are attached to the inner surface of the balloon envelope and the outer surface of the ballonet. In this manner, the internal panels support the ballonet centered within the balloon envelope. The internal panels support the ballonet in an upright position within the balloon envelope, and serve to help prevent twisting, tangling, and/or buckling of the ballonet during inflation. The internal panels support the ballonet weight and hold the ballonet in position in both the inflated and un-inflated state.

The balloon envelope and ballonet may be made of the same material, which may be a blend of nylon and Low Density Polyethylene (LDPE), which may have a thickness on the order of 1-1.5 mils. The balloon envelope may advantageously be made of a series of connected envelope gores, that may be heat sealed together. Once inflated, the balloon envelope will have a pumpkin-shape with valleys at the point where the gores are joined together. In one embodiment, the balloon envelope may be formed from 36 gores each having a length of 65 feet providing for an inflated balloon diameter on the order of 15 meters. Similarly, the ballonet may also be made of a series of connected envelope gores, that may be heat sealed together. Once inflated, the ballonet will also have a pumpkin-shape with valleys at the point where the gores are joined together. In one embodiment, the ballonet may be formed from 30 or 36 gores each having a length of 55 feet providing for an inflated ballonet diameter on the order of 12 meters. The internal panels may also be used with balloon envelopes and ballonets that are not formed using gores.

However, the internal panels may also be made from the same material as the balloon envelope and ballonet gores. The internal panels may be advantageously heat sealed to the balloon envelope gores and to the ballonet gores at the time the gores of the balloon envelope gores and ballonet gores are being heat sealed together to form the balloon envelope and ballonet. Alternately, the gores may be attached to the outside of the ballonet during the manufacture of the ballonet, and later attached to the inside of the balloon envelope during manufacture of the balloon envelope. The ability to heat seal the internal panels to the balloon envelope gores and the ballonet gores as they are being constructed advantageously allows the internal panels to be simply incorporated into the manufacture of the balloon envelope and ballonet, requiring only a few additional heat sealing steps. The internal panels may be attached to the outside of the ballonet at the intersection of where the gores of the ballonet are sealed together, or may be attached in the middle (or other portion) of a single ballonet gore. Similarly, the internal panels may be attached to the inside of the balloon envelope at the intersection of where the gores of the balloon envelope are sealed together, or may be attached in the middle (or other portion) of a single balloon envelope gore.

The present embodiments easily allow the internal panels to be heat sealed to the ballonet and balloon envelope during the manufacture of the ballonet and balloon envelope. Two additional heat sealing steps may be used to attach each internal panel to the ballonet and the balloon envelope. In fact, no additional heat sealing steps may be required if the internal panel is heat sealed at the intersection of two ballonet gores at the same time as the adjacent ballonet gores of the ballonet are being sealed together, and at the same time adjacent balloon envelope gores of the balloon envelope are being sealed together. The internal panels allow for controlled deployment of the ballonet, help with preventing of twisting, tangling, and/or bunching of the ballonet during inflation, and help with preventing the resulting stresses caused by the twisting, tangling, and/or bunching that can cause premature failure of the ballonet due to film rupture.

The internal paneling system supports the ballonet during deployment, and also controls the positioning of the ballonet during inflation resulting in a more upright balloon, and may solve both deployment and tilt issues seen during current altitude control maneuvering.

It should be understood that the above examples are provided for illustrative purposes, and should not be construed as limiting. As such, the method additionally or alternatively includes other steps or includes fewer steps, without departing from the scope of the invention.

II. EXAMPLE BALLOON NETWORKS

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area.

Further, in some embodiments, some or all balloons may be continually moving while at the same time maintaining desired coverage over the ground (e.g., as balloons move out of an area, other balloons move in to take their place). In such an embodiment, a station-keeping process may in fact take the form of fleet-planning process that plans and coordinates the movement of the balloons. Other examples of station-keeping are also possible.

B. Control of Balloons in a Balloon Network

Figure 2:
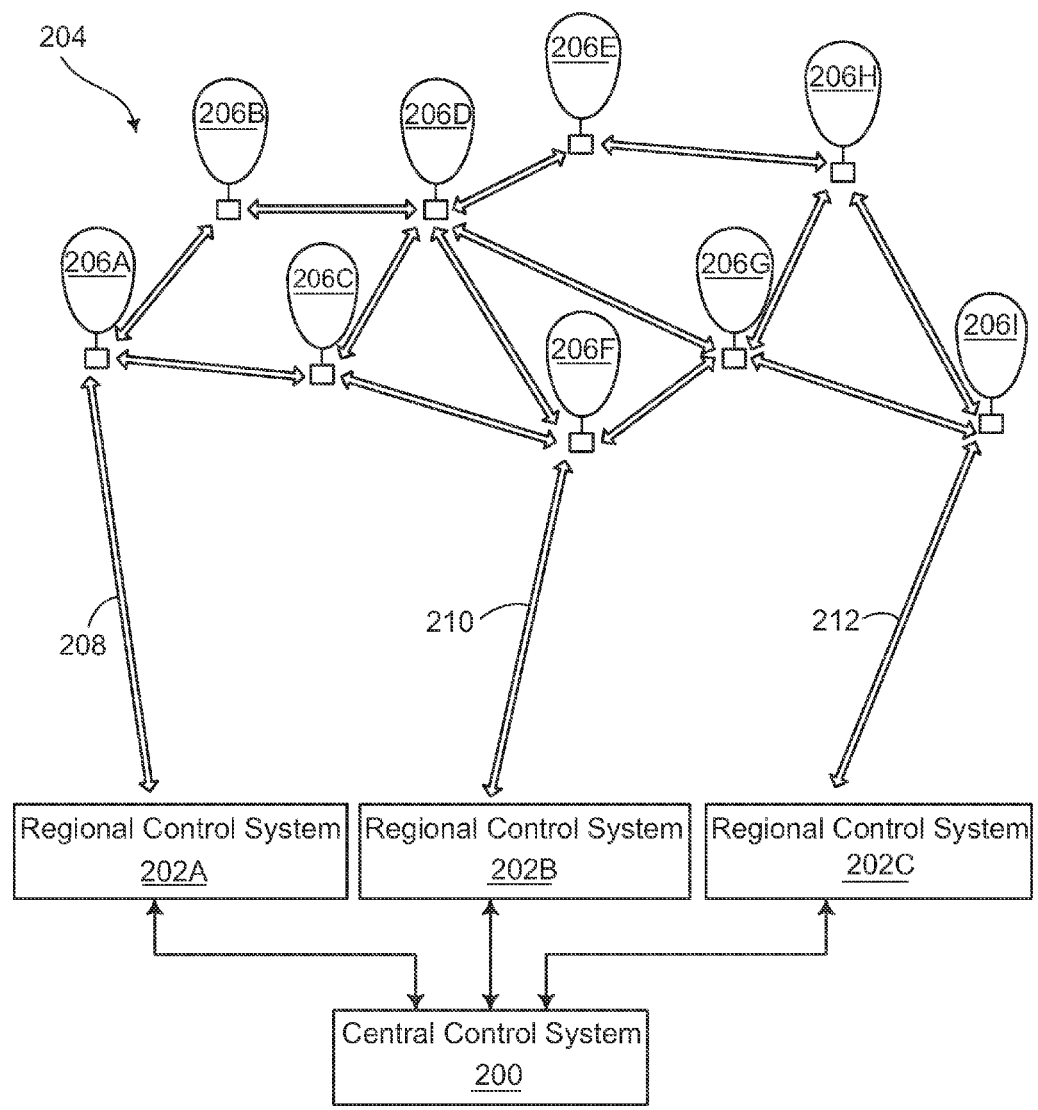
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

Further, control systems such as those described above may determine when and/or where individual balloons should be taken down. Additionally, the control systems may navigate the balloons to locations where they are to be taken down. The control systems may also cause the balloons to be taken down, and may control their descent and/or otherwise facilitate their descent.

III. EXEMPLARY BALLOON CONFIGURATION

Figure 3:
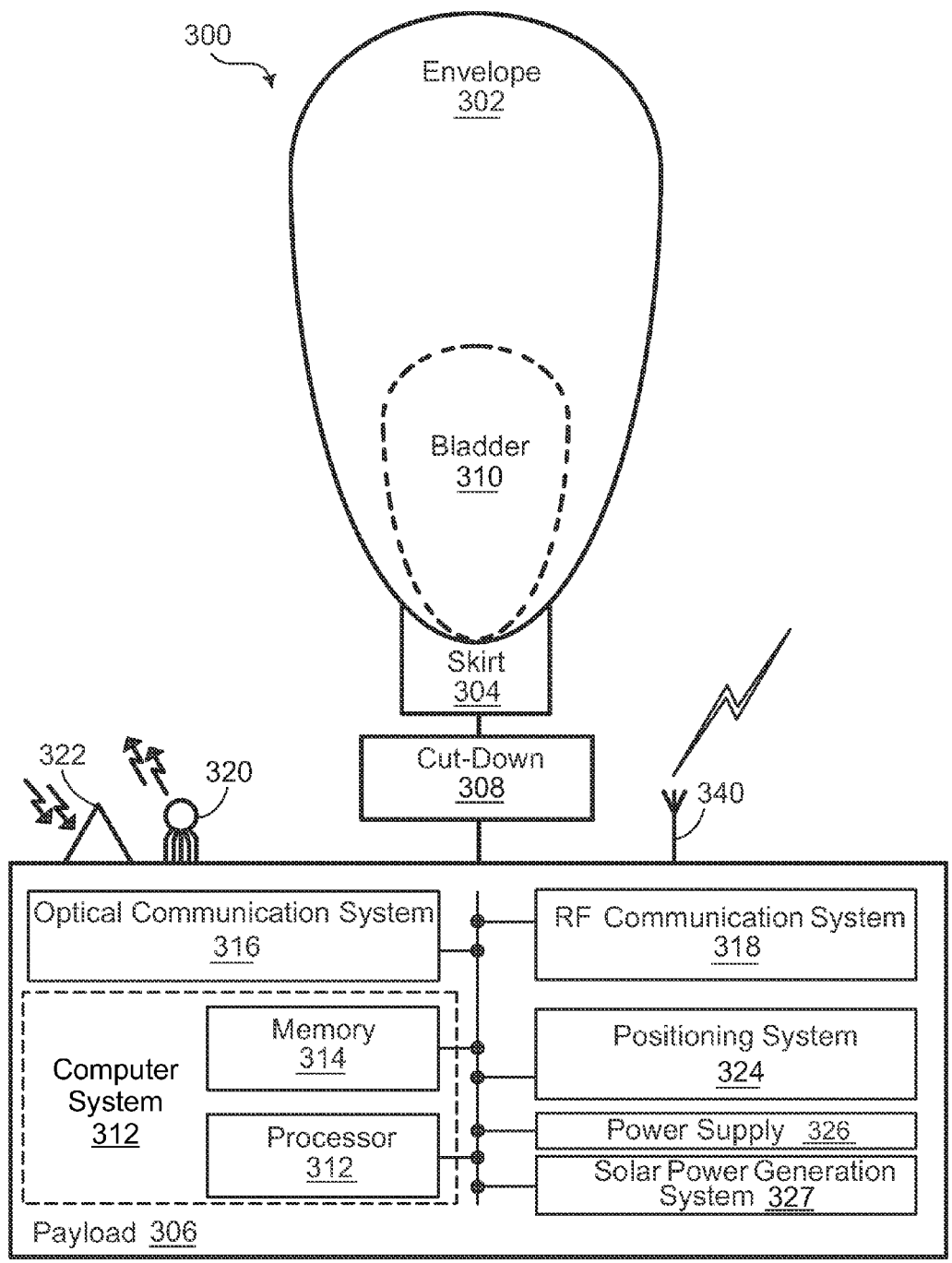
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down device 308, which is attached between the balloon 302 and payload 306.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a computer system 312, which may include a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down device 308. The cut-down device 308 may be activated to separate the payload 306 from the rest of balloon 300. The cut-down device 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced. Note that in an example embodiment, the cut-down device 308 may be used in conjunction with a parachute system. However, it should be understood that a cut-down device 308 is optional.

In an alternative arrangement, a balloon may not include a cut-down device. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft. In yet another embodiment, the balloon may include a parachute system configured to enable the balloon 300 and payload 306 to descend safely to the ground.

IV. EXAMPLE BALLOON DEPLOYMENT CONTROL PANELING SYSTEM

Figure 4A:
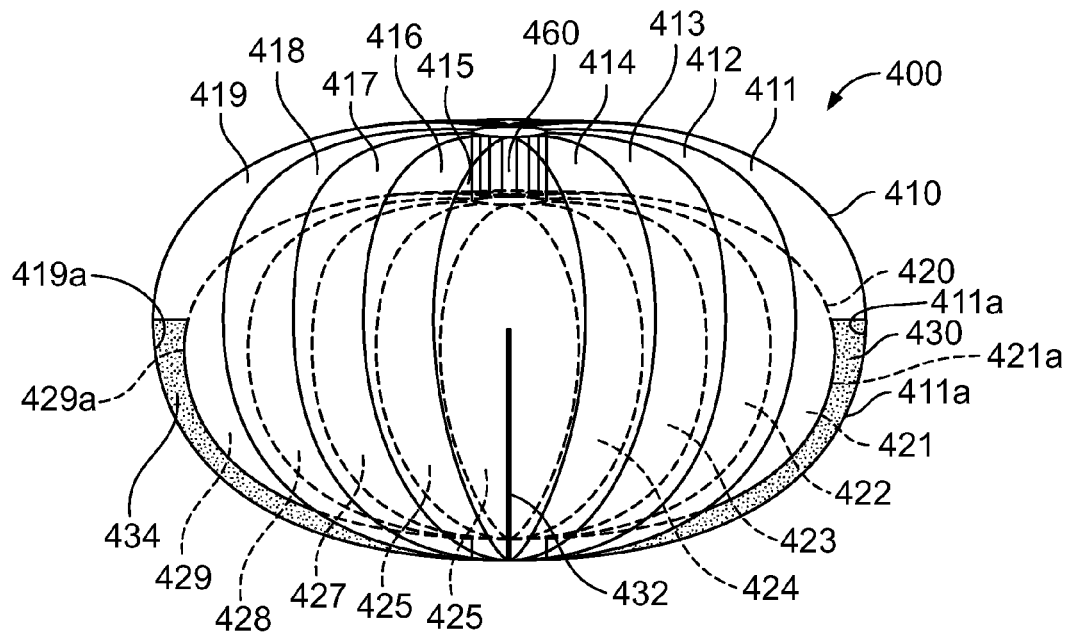
FIG. 4A is an illustration of a side view of balloon system 400, with outer balloon envelope 410 and inner ballonet 420 shown in fully inflated states with a plurality of internal panels extending between, and attached to, a portion of the inner surface of balloon envelope 410 and a portion an outer surface of inner ballonet 420, according to an example embodiment.

The present embodiments are illustrated in FIGS. 4A-D and 5A-D. FIG. 4A is an illustration of a side view of balloon system 400, with outer balloon envelope 410 and inner ballonet 420 (positioned within outer balloon envelope 410) shown in fully inflated states. The inner ballonet 420 is suspended beneath a top of the balloon envelope 410 by suspension lines 460. A plurality of internal panels 430, 432, 434, and 436 (shown in FIG. 4B) are shown extending between a lower portion of the inner surface of balloon envelope 410 and a lower portion of an outer surface of inner ballonet 420. The internal panels 430, 432, 434, and 436 are attached to the inner surface of balloon envelope 410 and the outer surface of inner ballonet 420.

Prior balloon systems using an internal ballonet have experienced severe twisting and bunching of the ballonet during inflation with air. The severe twisting and bunching during the inflation process could cause overstressing of the ballonet material causing a premature rupture of the ballonet as the ballonet is inflated and deflated many times during the life of the balloon system. The internal panels 430, 432, 434, and 436 help to prevent the ballonet 420 from twisting or bunching up within the balloon envelope 410 during inflation because the internal panels are attached to the outer surface of ballonet 420 and to the inner surface of balloon envelope 410. Therefore, if the ballonet 420 starts to twist clockwise about a vertical axis of the ballonet 420, the attachment of the internal panels to the inner surface of the balloon envelope 410 allows for only a small amount of twisting by the ballonet 420.

In addition, prior ballonets would sometimes inflate unevenly causing the ballonet to tilt to one side of the balloon envelope. Internal panels 430, 432, 434, and 436 support the ballonet 420 centered within the balloon envelope which prevents the ballonet 420 from tilting to one side within the balloon envelope 410. In particular, if the ballonet 420 starts to tilt to one side, the attachment of the internal panel on the opposite side serves to prevent the ballonet 420 from tilting as the ballonet 420 is supported and held in a centered position within balloon envelope 410 by the internal panels.

In FIG. 4A, four vertically extending panels 430, 432, 434, and 436 are shown equally spaced from each other by 90 degrees. It is also possible to have two or three vertically extending panels, or even more than 4 panels, although the more internal panels that are added the more weight is added to the balloon system 400 and the greater the number of manufacturing steps are required to attach the panels. A balloon system having three or four internal panels provides the optimum trade-off between support and added weight and manufacturing complexity.

FIG. 4A illustrates balloon envelope 410 made from a series of adjacent gores 411-419 that have been attached to each other. In one embodiment, the adjacent gores 411-419 of balloon envelope 410 are heat sealed together. When inflated, the balloon envelope 410 made of adjacent gores takes on a pumpkin shape with valleys between adjacent gores at the point of attachment between adjacent gores. Balloon envelope 410 is a simplified version of a balloon envelope which may have 36 adjacent gores. Similarly, FIG. 4A illustrates ballonet 420 made from a series of adjacent gores 421-425 and 427-429 that have been attached to each other. In one embodiment, the gores of the ballonet 420 are heat sealed together. When inflated, the ballonet 420 made of adjacent gores takes on a pumpkin shape with valleys between adjacent gores at the point of attachment between adjacent gores.

Ballonet 420 is a simplified version of a ballonet which may have 30 or 36 adjacent gores. In one embodiment, the balloon envelope 410 may be formed from 36 gores each having a length of 65 feet providing for an inflated balloon diameter on the order of 15 meters. Similarly, the ballonet 420 may also be made of a series of connected envelope gores, that may be heat sealed together. Once inflated, the ballonet 420 will also have a pumpkin-shape with valleys at the point where the gores are joined together. In one embodiment, the ballonet 420 may be formed from 30 or 36 gores each having a length of 55 feet providing for an inflated ballonet diameter on the order of 12 meters.

It will be appreciated that internal panels illustrated in the present embodiments may also be used with balloon envelopes and ballonets that are not constructed of adjacent gores attached together, and the internal panels would still serve the purpose of helping to prevent twisting and bunching of the ballonet during inflation, and the purpose of maintaining the ballonet centered within the balloon envelope during deployment and during inflation.

In the embodiment shown in FIG. 4A, the internal panels are shown extending between the lower portion of balloon envelope 410 and the lower portion of ballonet 420. The internal panels could also extend between upper portions of the balloon envelope 410 and ballonet 420, or from central portions of balloon envelope 410 and ballonet 420. Regardless of the portions to which the internal panels are attached, the internal panels support the ballonet centered within the balloon envelope. The internal panels support the ballonet in an upright position within the balloon envelope, and serve to help prevent twisting, tangling, and/or buckling of the ballonet during inflation, thus reducing stress and strain on the ballonet during inflation. The internal panels support the ballonet weight and hold the ballonet in position in both the inflated and un-inflated state.

Figure 4B:
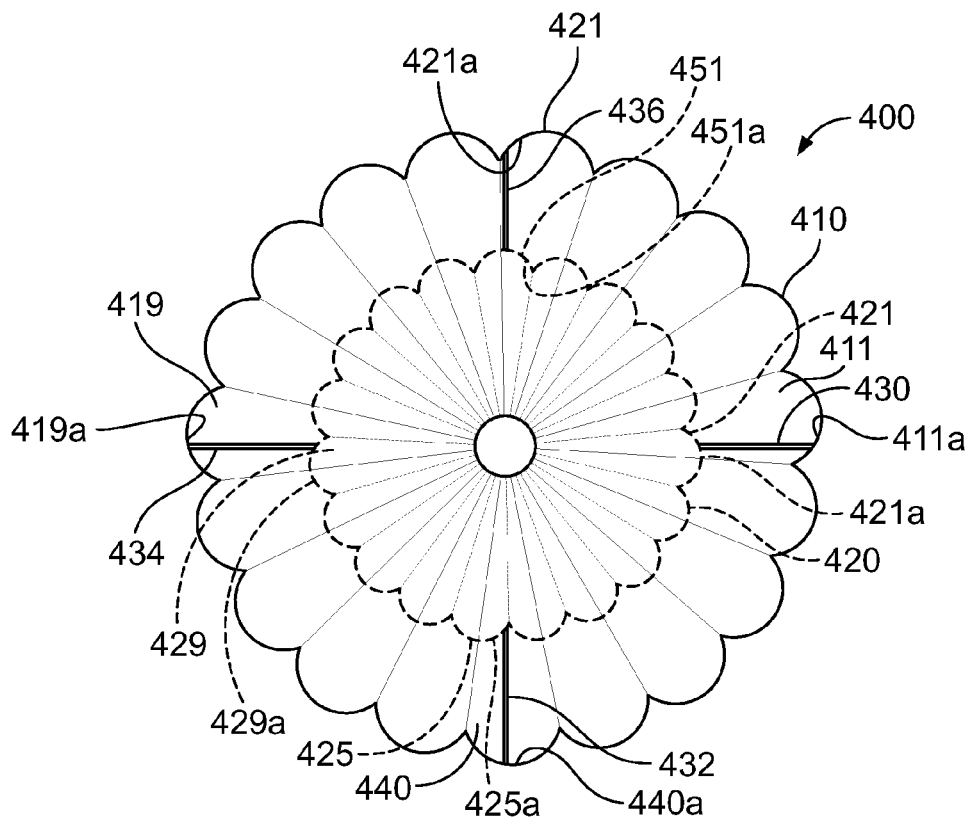
FIG. 4B is an illustration of a top view of balloon system 400 shown in FIG. 4A, showing internals panels 430, 432, 434, and 436 attached to the inner surface of balloon envelope 410 and attached to the outer surface of inner ballonet 420.

FIG. 4B is an illustration of a top view of balloon system 400 shown in FIG. 4A, showing internal panels 430, 432, 434, and 436 attached to the inner surface of balloon envelope 410 and attached to the outer surface of inner ballonet 420. Internal panels 430, 432, 434, and 436 are shown equidistantly vertically spaced from each other and attached to the inner surface of balloon envelope 410 and the outer surface of ballonet 420. Internal panel 430 is shown attached to inner surface 411a of gore 411 of balloon envelope 410 and to outer surface 421a of gore 421 of ballonet 420. Internal panel 432 is shown attached to inner surface 440a of gore 440 of balloon envelope 410 and to outer surface 425a of gore 425 of ballonet 420. Internal panel 434 is shown attached to inner surface 419a of gore 419 of balloon envelope 410 and to outer surface 429a of gore 429 of ballonet 420. Internal panel 436 is shown attached to inner surface 421a of gore 421 of balloon envelope 410 and to outer surface 451a of gore 451 of ballonet 420.

In FIG. 4B, internal panels 430, 432, 434, and 436 are shown attached to the balloon envelope 410 and ballonet 420 at a position between the intersection between adjacent gores of the balloon envelope 410 and ballonet. The internal panels may also be attached to the outside of the ballonet 420 at the intersection of where the gores of the ballonet 420 are sealed together, or may be attached in the middle (or other portion) of a single ballonet gore. Similarly, the internal panels may be attached to the inside of the balloon envelope 410 at the intersection of where the gores of the balloon envelope 410 are sealed together, or may be attached in the middle (or other portion) of a single balloon envelope gore.

The balloon envelope 410 and ballonet 420 may be made of the same material, which may be a blend of nylon and Low Density Polyethylene (LDPE), which may have a thickness on the order of 1-1.5 mils. The internal panels may also be made from the same material as the balloon envelope and ballonet gores, although they could be made of a different material as well. The internal panels 430, 432, 434, and 436 may be advantageously heat sealed to the balloon envelope gores and to the ballonet gores at the time the gores of the balloon envelope gores and ballonet gores are being heat sealed together to form the balloon envelope and ballonet. Alternately, the gores may be attached to the outside of the ballonet 420 during the manufacture of the ballonet 420, and later attached to the inside of the balloon envelope 410 during manufacture of the balloon envelope 410. The ability to heat seal the internal panels to the balloon envelope gores and the ballonet gores as they are being constructed advantageously allows the internal panels 430, 432, 434, and 436 to be simply incorporated into the manufacture of the balloon envelope 410 and ballonet 420, requiring only a few additional heat sealing steps.

The present embodiments easily allow the internal panels to be heat sealed to the ballonet and balloon envelope during the manufacture of the ballonet 420 and balloon envelope 410. Two additional heat sealing steps may be used to attach each internal panel to the ballonet 420 and the balloon envelope 410. In fact, no additional heat sealing steps may be required if the internal panel is heat sealed at the intersection of two ballonet gores at the same time as the adjacent ballonet gores of the ballonet 420 are being sealed together, and at the same time adjacent balloon envelope gores of the balloon envelope 410 are being sealed together. The internal panels 430, 432, 434, and 436 allow for controlled deployment of the ballonet 420, help with preventing of twisting, tangling, and/or bunching of the ballonet 420 during inflation, and help with preventing the resulting stresses caused by the twisting, tangling, and/or bunching that can cause premature failure of the ballonet 420 due to film rupture.

Figure 4C:
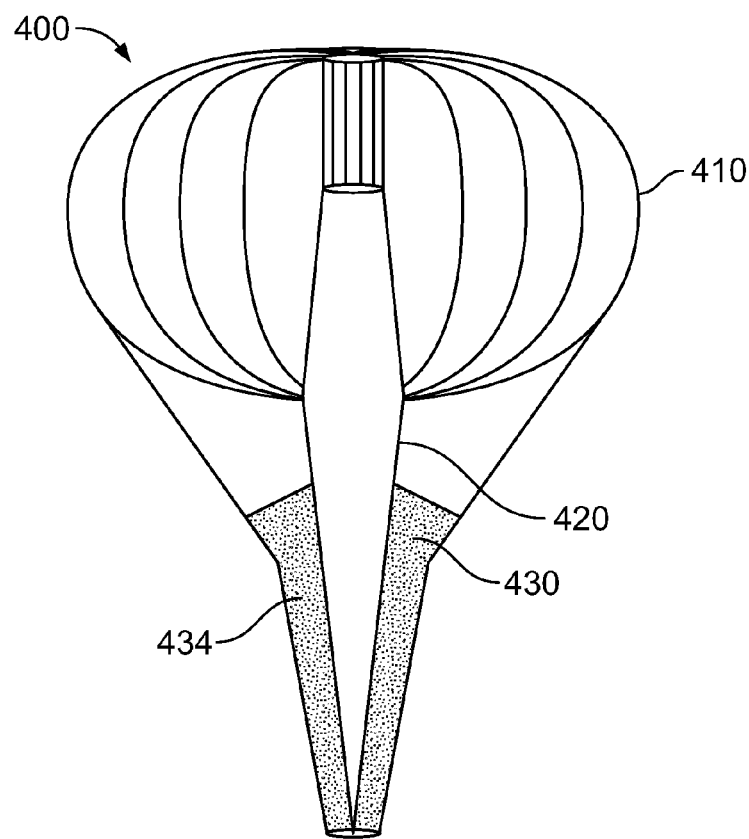
FIG. 4C is an illustration of a side view of balloon system 400 shown in FIGS. 4A-B with balloon envelope 410 partially inflated and inner ballonet 420 shown in an un-inflated state.
Figure 4D:
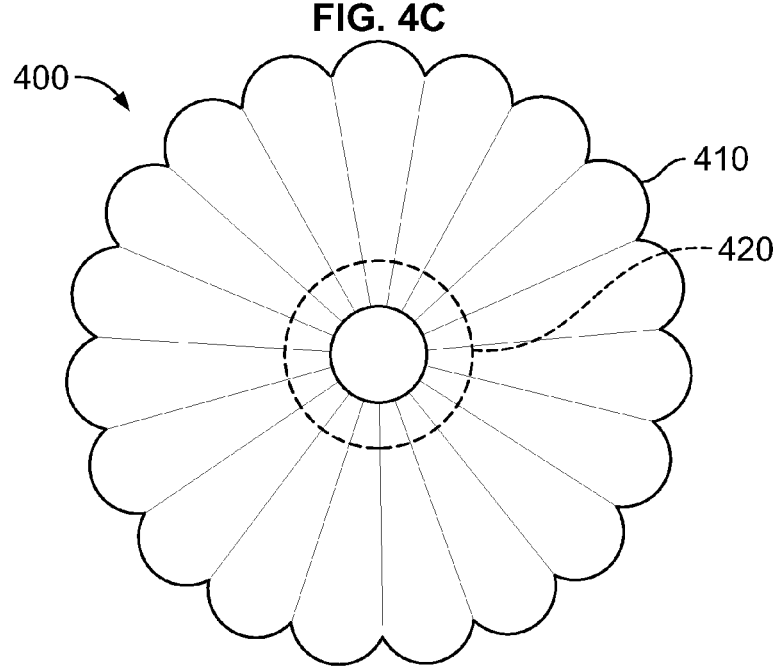
FIG. 4D is an illustration of a top view of the balloon system 400 shown in FIG. 4C.

FIG. 4C is an illustration of a side view of balloon system 400 shown in FIGS. 4A-B with balloon envelope 410 partially inflated and inner ballonet 420 shown in an un-inflated state. During deployment of the balloon system 400 from the ground, the volume of lifting gas within the balloon envelope 410 may be on the order of 1/20 of the volume at stratospheric elevation. During deployment the ballonet 420 is in an un-inflated state as shown in FIG. 4C, the balloon envelope 410 and ballonet 420 are draped beneath the inflated portion of the balloon envelope 410. As the balloon system 400 ascends the volume of lifting gas expands, eventually reaching full inflation as shown in FIG. 4A. The internal panels, such as internal panels 430 and 434 shown in FIG. 4C, serve to maintain the uninflated ballonet 420 in a centered positioned within the balloon envelope 410. FIG. 4D is a top view of the balloon system shown in FIG. 4D. Ballonet 410 is shown in a centered position within balloon envelope 410.

Figure 5A:
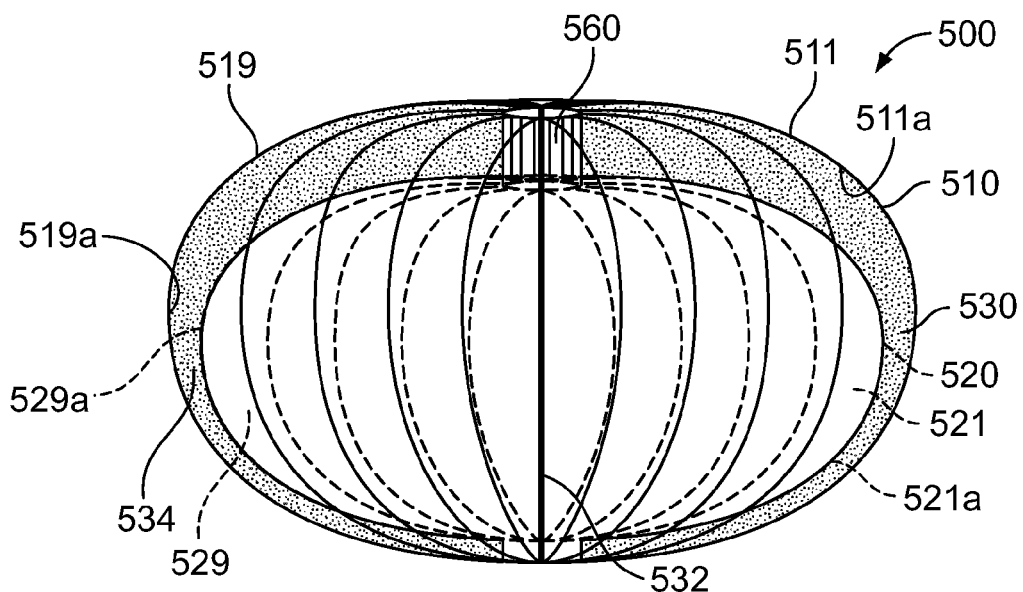
FIG. 5A is an illustration of a side view of balloon system 500, with outer balloon envelope 510 and inner ballonet 520 shown in fully inflated states with a plurality of internal panels extending between, and attached to, the inner surface of balloon envelope 510 and an outer surface of inner ballonet 520, according to another example embodiment.

FIG. 5A is an illustration of a side view of balloon system 500, with outer balloon envelope 510 and inner ballonet 520 (positioned within balloon envelope 510) shown in fully inflated states with a plurality of internal panels extending between, and attached to, the inner surface of balloon envelope 510 and an outer surface of inner ballonet 520, according to another example embodiment.

In FIG. 5A, internal panels 530, 532, 534, and 536 (shown in FIG. 5B) are shown extending completely from the top of the balloon envelope 510 to the bottom of the balloon envelope 510. The inner ballonet 520 is suspended beneath a top of the balloon envelope 510 by suspension lines 560. In this embodiment, the internal panels are spaced apart 90 degrees from each other, and may be attached to the outside of the ballonet 520 and extend completely between the ballonet 520 and the balloon envelope 510 from the top to the bottom of the balloon envelope 510. The internal panels 530, 532, 534, and 536 are shown attached to the inner surface of the balloon envelope 510 and the outer surface of the ballonet 520. In this manner, the internal panels support the ballonet 520 centered within the balloon envelope 510. The internal panels support the ballonet 520 in an upright position within the balloon envelope 510, and serve to help prevent twisting, tangling, and/or buckling of the ballonet during inflation. The internal panels support the ballonet weight and hold the ballonet 520 in position in both the inflated and un-inflated state.

In FIG. 5A, four vertically extending panels 530, 532, 534, and 536 are shown equally spaced from each other by 90 degrees. It is also possible to have two or three vertically extending panels, or even more than 4 panels, although the more internal panels that are added the more weight is added to the balloon system 500 and the greater the number of manufacturing steps are required to attach the panels. A balloon system having three or four internal panels provides the optimum trade-off between support and added weight and manufacturing complexity.

FIG. 5A illustrates balloon envelope 510 made from a series of adjacent gores that have been attached to each other. In one embodiment, the adjacent gores of balloon envelope 510 are heat sealed together. When inflated, the balloon envelope 510 made of adjacent gores takes on a pumpkin shape with valleys between adjacent gores at the point of attachment between adjacent gores. Balloon envelope 510 is a simplified version of a balloon envelope which may have 36 adjacent gores. Similarly, FIG. 5A illustrates ballonet 520 made from a series of adjacent gores that have been attached to each other. In one embodiment, the gores of the ballonet 520 are heat sealed together. When inflated, the ballonet 520 made of adjacent gores takes on a pumpkin shape with valleys between adjacent gores at the point of attachment between adjacent gores.

In the embodiment shown in FIG. 5A, the internal panels are shown extending completely between the inner surface of balloon envelope 510 and inner ballonet 520. The internal panels 530, 532, 534, and 536 support the ballonet 520 centered within the balloon envelope 510. The internal panels support the ballonet 520 in an upright position within the balloon envelope 510, and serve to help prevent twisting, tangling, and/or buckling of the ballonet 520 during inflation, thus reducing stress and strain on the ballonet 520 during inflation. The internal panels support the ballonet weight and hold the ballonet in position in both the inflated and un-inflated state.

Figure 5B:
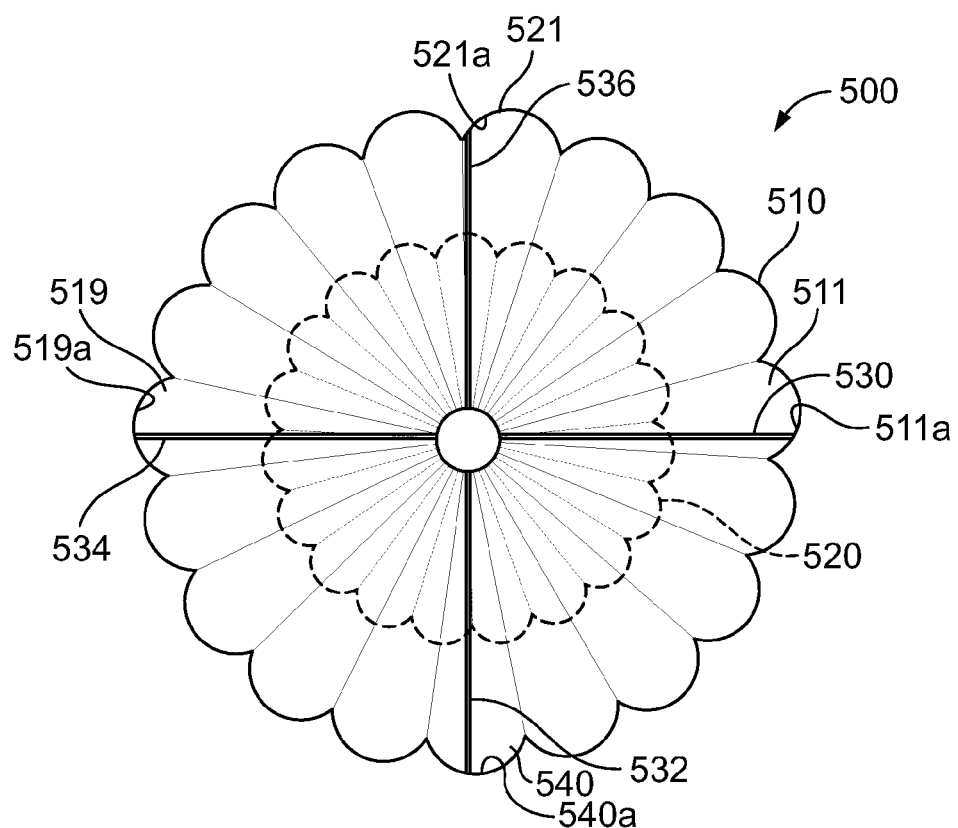
FIG. 5B is an illustration of a top view of balloon system 500 shown in FIG. 5A, showing internals panels 530, 532, 534, and 536 attached to the inner surface of balloon envelope 510 and attached to the outer surface of inner ballonet 520.

FIG. 5B is an illustration of a top view of balloon system 500 shown in FIG. 5A, showing internal panels 530, 532, 534, and 536 attached to the inner surface of balloon envelope 510 and attached to the outer surface of inner ballonet 520. Internal panel 530, 532, 534, and 536 are shown equidistantly vertically spaced from each other and attached to the inner surface of balloon envelope 510 and the outer surface of ballonet 520. Internal panel 530 is shown attached to inner surface 511a of gore 511 of balloon envelope 510 and attached to ballonet 520. Internal panel 532 is shown attached to inner surface 540a of gore 540 of balloon envelope 510 and to ballonet 520. Internal panel 534 is shown attached to inner surface 519a of gore 519 of balloon envelope 510 and to ballonet 520. Internal panel 536 is shown attached to inner surface 521a of gore 521 of balloon envelope 510 and to ballonet 520.

In FIG. 5B, internal panels 530, 532, 534, and 536 are shown attached to the balloon envelope 510 at a position between the intersection between adjacent gores of the balloon envelope 510. The internal panels may also be attached to the inside of the balloon envelope 510 at the intersection of where the gores of the balloon envelope 510 are sealed together, or may be attached in the middle (or other portion) of a single balloon envelope gore.

As with balloon system 400 shown in FIGS. 4A-D, the balloon envelope 510 and ballonet 520 of balloon system 500 may be made of the same material, which may be a blend of nylon and Low Density Polyethylene (LDPE), which may have a thickness on the order of 1-1.5 mils. The internal panels may also be made from the same material as the balloon envelope and ballonet gores, although they could be made of a different material as well. The internal panels 530, 532, 534, and 536 may be advantageously heat sealed to the balloon envelope gores and to the ballonet gores at the time the gores of the balloon envelope gores and ballonet gores are being heat sealed together to form the balloon envelope and ballonet. Alternately, the gores may be attached to the outside of the ballonet 520 during the manufacture of the ballonet 520, and later attached to the inside of the balloon envelope 510 during manufacture of the balloon envelope 510. The ability to heat seal the internal panels to the balloon envelope gores and the ballonet gores as they are being constructed advantageously allows the internal panels 530, 532, 534, and 536 to be simply incorporated into the manufacture of the balloon envelope 510 and ballonet 520, requiring only a few additional heat sealing steps.

The present embodiments easily allow the internal panels to be heat sealed to the ballonet and balloon envelope during the manufacture of the ballonet 520 and balloon envelope 510. Two additional heat sealing steps may be used to attach each internal panel to the ballonet 520 and the balloon envelope 510. In fact, no additional heat sealing steps may be required if the internal panel is heat sealed at the intersection of two ballonet gores at the same time as the adjacent ballonet gores of the ballonet 520 are being sealed together, and at the same time adjacent balloon envelope gores of the balloon envelope 510 are being sealed together. As with balloon system 400 illustrated in FIGS. 4A-D, the internal panels 530, 532, 534, and 536 allow for controlled deployment of the ballonet 520, help with preventing of twisting, tangling, and/or bunching of the ballonet 520 during inflation, and help with preventing the resulting stresses caused by the twisting, tangling, and/or bunching that can cause premature failure of the ballonet 420 due to film rupture.

Figure 5C:
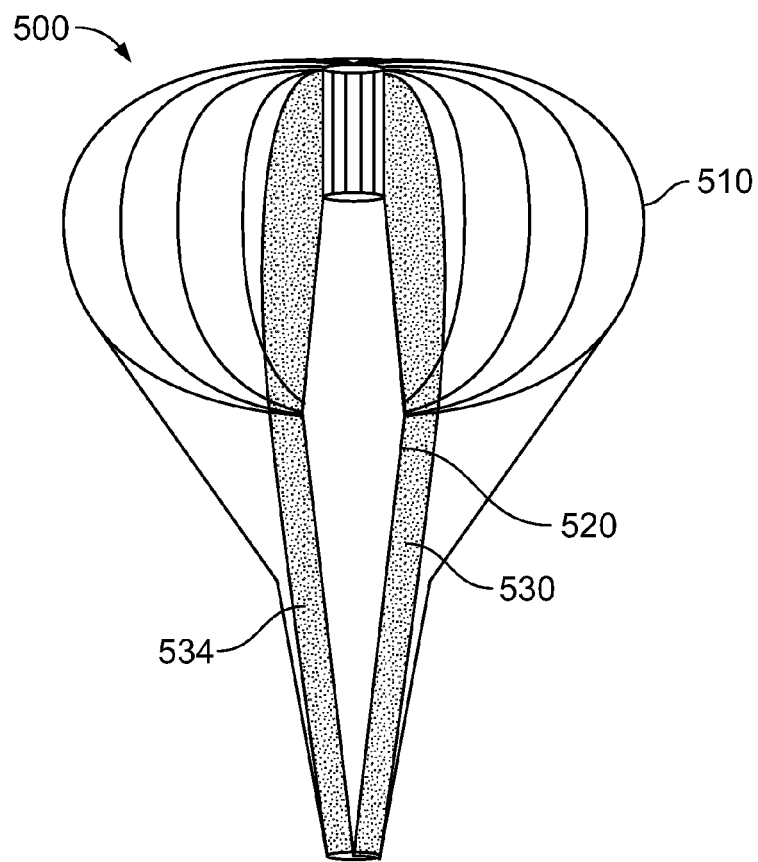
FIG. 5C is an illustration of a side view of balloon system 500 shown in FIGS. 5A-B with balloon envelope 510 partially inflated and inner ballonet 520 shown in an un-inflated state.
Figure 5D:
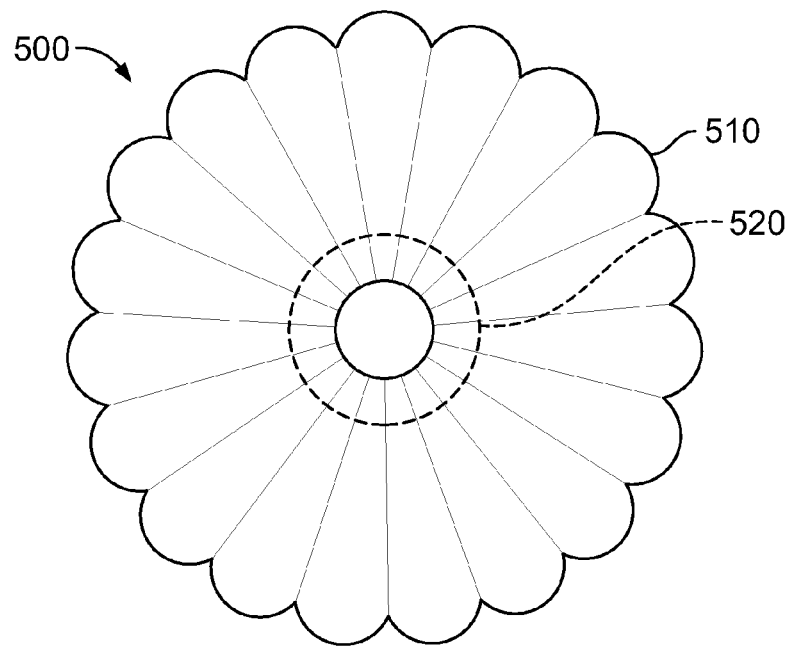
FIG. 5D is an illustration of a top view of the balloon system 400 shown in FIG. 5C.

FIG. 5C is an illustration of a side view of balloon system 400 shown in FIGS. 5A-B with balloon envelope 510 partially inflated and inner ballonet 520 shown in an un-inflated state. During deployment of the balloon system 500 from the ground, the volume of lifting gas within the balloon envelope 510 may be on the order of ⅟₂₀ of the volume at stratospheric elevation. During deployment the ballonet 520 is in an un-inflated state as shown in FIG. 5C. The balloon envelope 510 and ballonet 520 are draped beneath the inflated portion of the balloon envelope 510. However, the internal panels, such as internal panels 530 and 534 shown in FIG. 5C, serve to maintain the uninflated ballonet 520 in a centered positioned within the balloon envelope 510. FIG. 5D is a top view of the balloon system shown in FIG. 5D. Ballonet 510 is shown in a centered position within balloon envelope 510.

The internal paneling system supports the ballonet during deployment, and also controls the positioning of the ballonet during inflation resulting in a more upright balloon, and may solve both deployment and tilt issues seen during current altitude control maneuvering.

V. EXAMPLE OF A METHOD OF CONSTRUCTING A BALLOON SYSTEM BALLONET CONTROL PANELING

Figure 6:
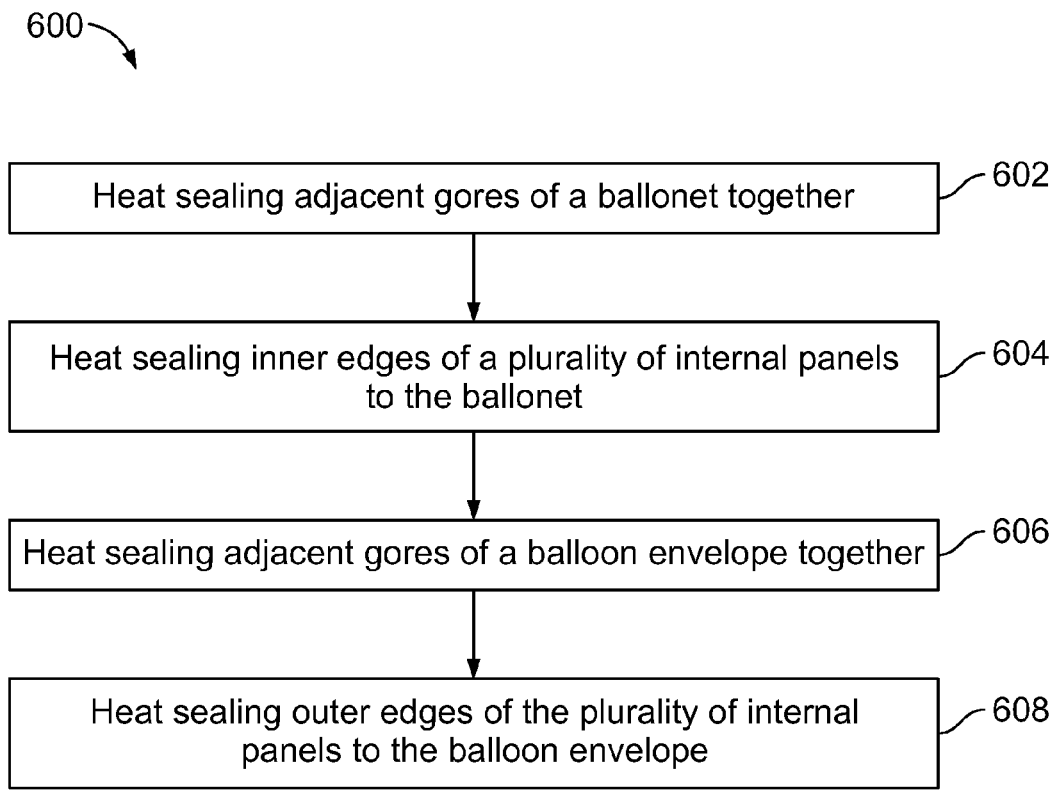
FIG. 6 is a method of constructing a balloon system, according to an example embodiment.

FIG. 6 is a simplified flow chart illustrating a method 600 of constructing a balloon system. Method 600 includes the step 602 of heat sealing adjacent gores of a ballonet together; step 604 of heat sealing inner edges of a plurality of internal panels to the ballonet; step 606 of heat sealing adjacent gores of a balloon envelope together; and step 608 of heat sealing outer edges of the plurality of internal panels to the balloon envelope.

VI. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A balloon system comprising:
   a balloon envelope;
   a ballonet positioned within the balloon envelope;
   a plurality of flexible internal panels extending within the balloon envelope between the ballonet and the balloon envelope, wherein the plurality of flexible internal panels each have a vertically extending inner edge that is attached to an outer surface of the ballonet, and the plurality of flexible internal panels each have a vertically extending outer edge that is attached to an inside surface of the balloon envelope;
   wherein the plurality of internal panels are attached to an outside of the ballonet and attached to an inside of the balloon envelope to support the ballonet during inflation of the ballonet; and
   wherein the plurality of internal panels are spaced angularly about a vertical axis of the ballonet.

2. The balloon system of claim 1, wherein the plurality of internal panels also extend vertically between the outside of the ballonet and the inside of the balloon envelope.

3. The balloon system of claim 2, wherein the plurality of internal panels are equally spaced about the vertical axis of the ballonet.

4. The balloon system of claim 3, wherein the plurality of internal panels includes 4 internal panels radially spaced from one another 90 degrees.

5. The balloon system of claim 3, wherein the plurality of internal panels includes 3 internal panels spaced radially from one another 120 degrees.

6. The balloon system of claim 1, wherein the plurality of internal panels are heat sealed to the outer surface of the ballonet and heat sealed to the inside surface of the balloon envelope.

7. The balloon system of claim 6, wherein the balloon envelope is constructed of a plurality of balloon envelope gores.

8. The balloon system of claim 7, wherein the plurality of internal panels are attached to an intersection between adjacent gores of the balloon envelope.

9. The balloon system of claim 6, wherein the ballonet is constructed of a plurality of ballonet gores.

10. The balloon system of claim 9, wherein the balloon envelope is constructed of a plurality of balloon envelope gores;
wherein each of the inner edges of the plurality of internal panels is attached to an intersection between adjacent gores of the ballonet; and
wherein each of the outer edges of each of the plurality of internal panels is attached to an intersection between adjacent gores of the balloon envelope.

11. The balloon system of claim 1, wherein the plurality of internal panels are constructed of a blend of nylon and Low Density Polyurethane.

12. The balloon system of claim 1, wherein the plurality of internal panels are constructed of the same material as the balloon envelope and ballonet.

13. The balloon system of claim 6, wherein at least some of the plurality of internal panels are attached to gores of the balloon envelope between intersections of the gores and adjacent gores of the balloon envelope.

14. The balloon system of claim 13, wherein the ballonet is constructed of a plurality of ballonet gores, and at least some of the plurality of internal panels are attached to gores of the ballonet between intersections of the gores and adjacent gores of the ballonet.

15. The balloon system of claim 1, wherein the plurality of internal panels extend between a portion of the inside surface of the balloon envelope and a portion of the outer surface of the ballonet.

16. The balloon system of claim 1, wherein the plurality of internal panels extend completely from a bottom of the balloon envelope to a top of the balloon envelope to the ballonet.

17. A balloon system comprising:
a balloon envelope;
a ballonet positioned within the balloon envelope;
means for helping to prevent twisting and bunching of the ballonet during inflation of the ballonet;
means for centering the ballonet within the balloon envelope to prevent the ballonet from tilting to one side of the balloon envelope during inflation of the ballonet, using flexible internal panels that extend horizontally an entire distance between the ballonet and the balloon envelope when the balloon envelope is inflated;
wherein each of the internal panels have a vertically extending inner edge that is attached to an outside of the ballonet, and each of the internal panels have a vertically extending outer edge that is attached to an inside of the balloon envelope; and
wherein each of the internal panels are spaced angularly about a vertical axis of the ballonet.

18. A method of constructing a balloon system comprising:
a balloon envelope;
a ballonet positioned within the balloon envelope;
a plurality of flexible internal panels extending within the balloon envelope between the ballonet and the balloon envelope, wherein the plurality of flexible internal panels each have a vertically extending inner edge that is attached to an outer surface of the ballonet, and the plurality of flexible internal panels each have a vertically extending outer edge that is attached to an inside surface of the balloon envelope;
wherein the plurality of internal panels are attached to an outside of the ballonet and attached to an inside of the balloon envelope to support the ballonet during inflation of the ballonet; and
wherein the plurality of internal panels are spaced angularly about a vertical axis of the ballonet;
including the steps of:
heat sealing adjacent gores of the ballonet together;
heat sealing inner edges of the plurality of internal panels to the ballonet;
heat sealing adjacent gores of the balloon envelope together; and
heat sealing outer edges of the plurality of internal panels to the balloon envelope.

19. The method of claim 18, wherein each of the plurality of internal panels is heat sealed to the balloon envelope at an intersection between adjacent gores of the balloon envelope.

20. The method of claim 19, wherein each of the plurality of internal panels is heat sealed to the ballonet at an intersection between adjacent gores of the ballonet.

21. The method of claim 18, wherein the heat sealing of adjacent gores of the ballonet together and the heating sealing of an inner edge of an internal panel of the plurality of internal panels to the ballonet are performed at the same time.

22. The method of claim 18, wherein the heat sealing of adjacent gores of the balloon envelope and the heat sealing of an outer edge of an internal panel of the plurality of internal panels to the balloon envelope are performed at the same time.

* * * * *